United States Patent [19]
Sygnator

[11] 3,766,636
[45] Oct. 23, 1973

[54] METHOD OF INSTALLING PANEL INSERT DEVICE

[75] Inventor: Henry A. Sygnator, Arlington Heights, Ill.

[73] Assignee: Illinois Tool Works Inc., Chicago, Ill.

[22] Filed: Oct. 8, 1971

[21] Appl. No.: 188,691

Related U.S. Application Data

[63] Continuation-in-part of Ser. No. 38,782, May 19, 1970, Pat. No. 3,662,805.

[52] U.S. Cl. .............................. 29/526, 24/211 R
[51] Int. Cl. .............................................. B23p 19/00
[58] Field of Search .................. 29/455 LM, 526; 151/41.73; 85/63, 67; 24/211 R; 52/617

[56] References Cited
UNITED STATES PATENTS

| | | | |
|---|---|---|---|
| 2,508,702 | 5/1950 | Baume | 29/526 UX |
| 2,877,818 | 3/1959 | Johnson | 151/41.73 |
| 2,967,593 | 1/1961 | Cushman | 29/526 UX |
| 3,197,854 | 8/1965 | Rohe et al. | 29/526 X |
| 3,434,262 | 3/1969 | Lawrence | 29/526 X |
| 3,485,282 | 12/1969 | Lopez et al. | 85/63 X |
| 3,535,750 | 10/1970 | Metz | 24/211 R |
| 3,579,942 | 5/1971 | Cole | 52/617 |
| 3,678,980 | 7/1972 | Gutshall | 151/41.73 |

Primary Examiner—Charlie T. Moon
Attorney—Robert W. Beart et al.

[57] ABSTRACT

The present invention relates generally to screw accommodating insert devices for installation in panels and more particularly to insert devices adapted for installation in relatively light weight panel structures such as panels comprised of a honeycomb type core bounded by skin sheets. The embodiments of the invention disclosed herein include an adapter member to be accommodated by a complementary cavity formed in a panel, said adapter having a central screw accommodating aperture and hub section, the over all axial extent of the adapter being not substantially greater than the thickness of the panel with which it is to be used. The insert device also includes a pair of superimposed apertured plate members telescopically associated with the hub section and shiftable laterally thereof between concentric and eccentric relation with respect to the hub axis.

2 Claims, 18 Drawing Figures

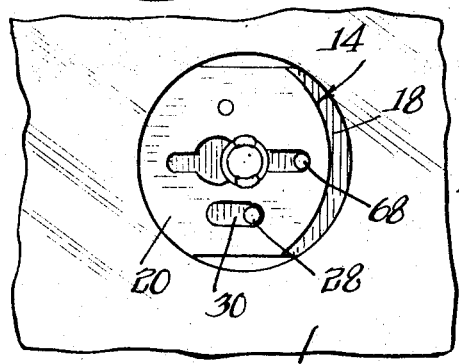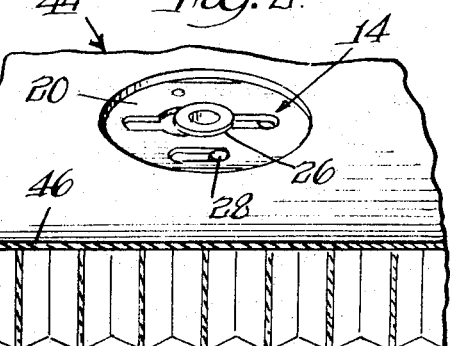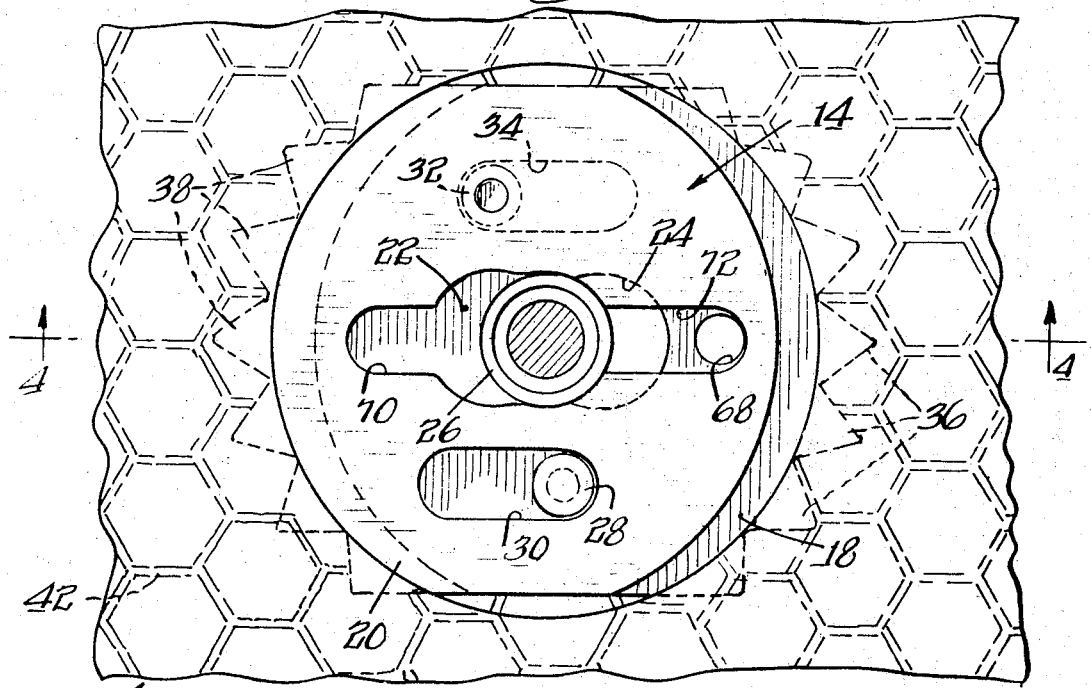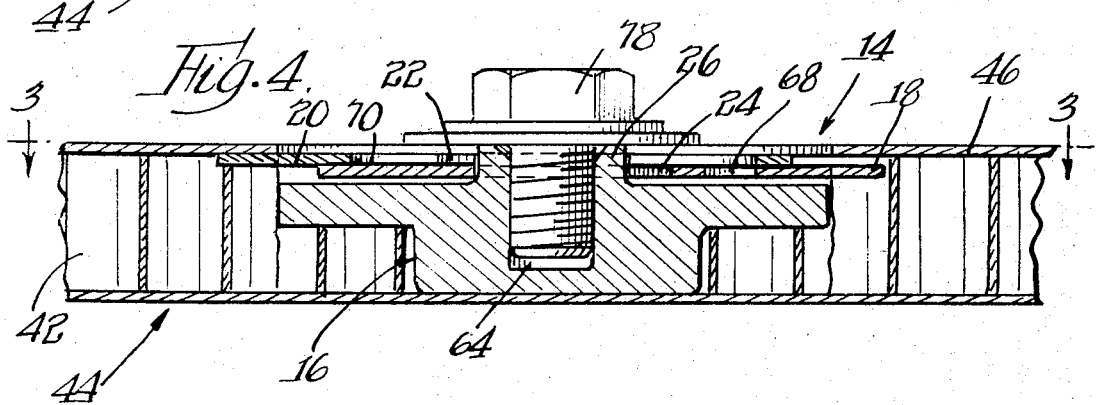

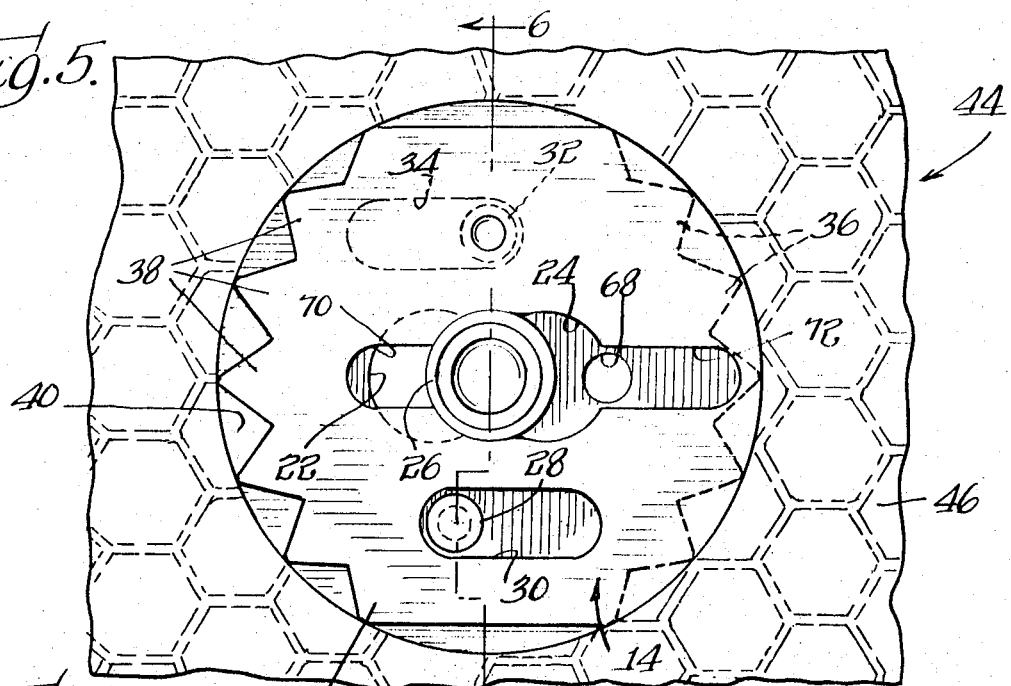
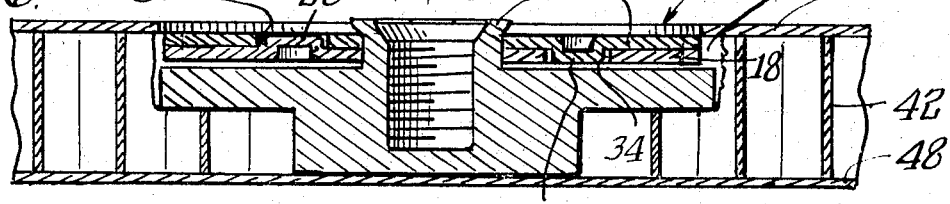
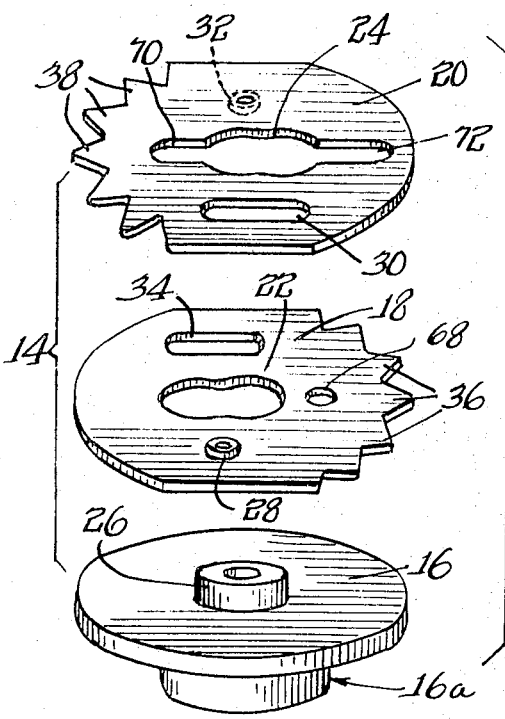
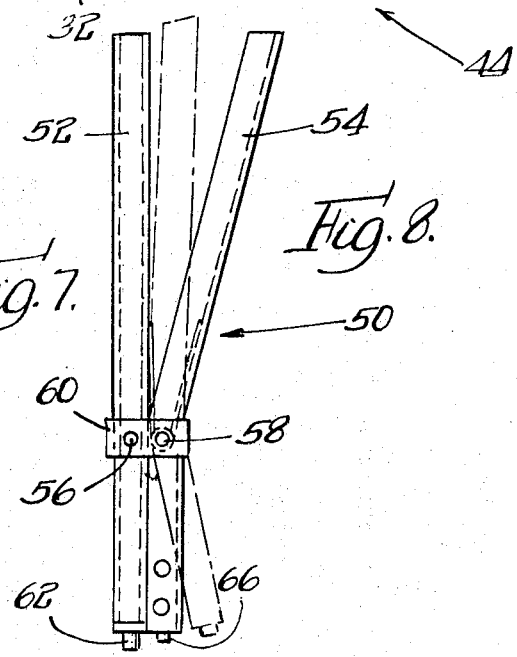

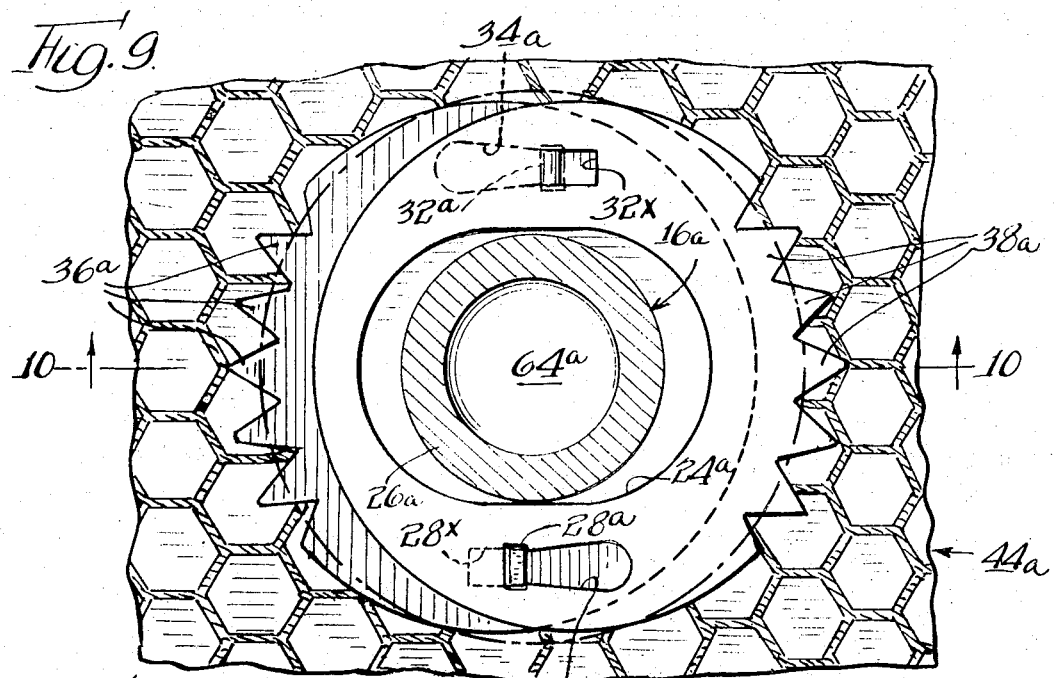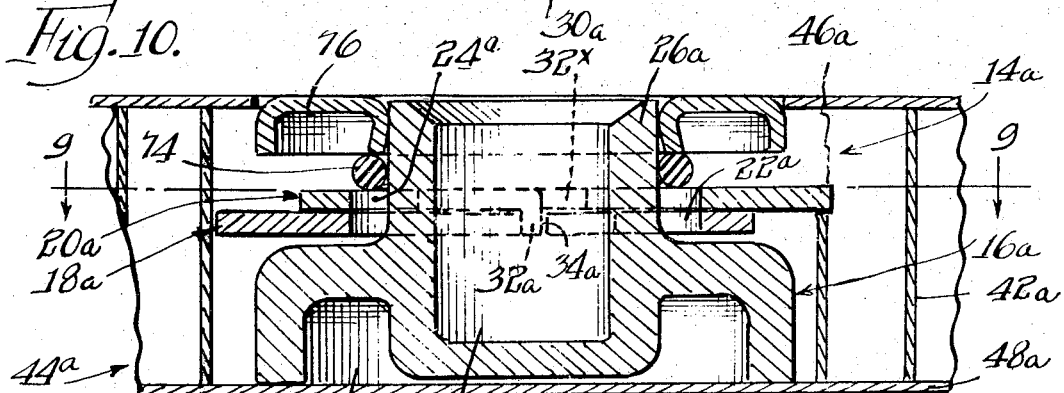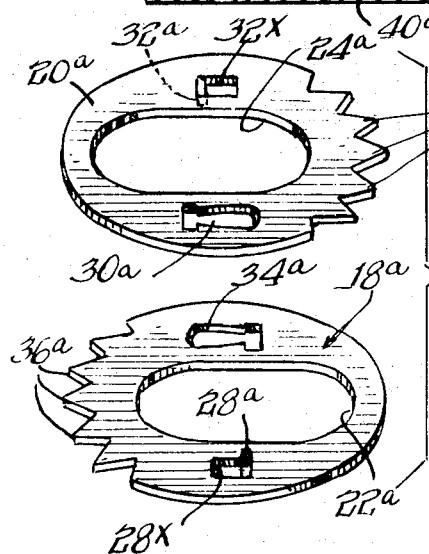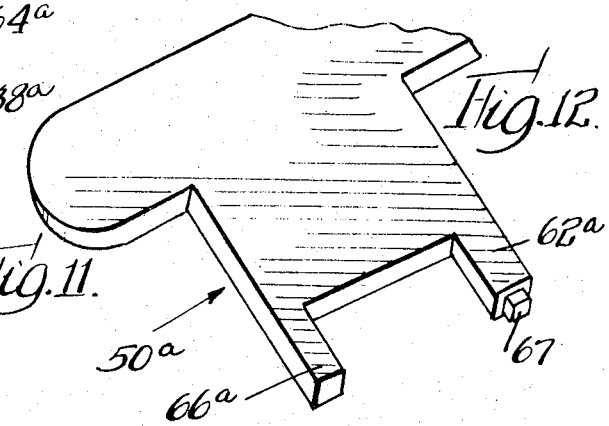

PATENTED OCT 23 1973 3,766,636
SHEET 4 OF 4
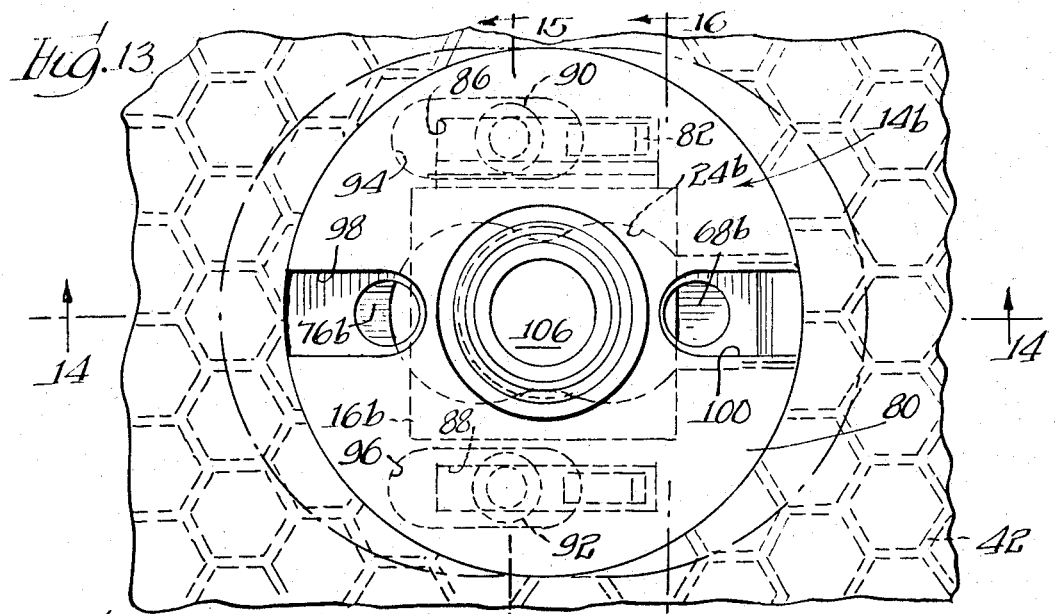
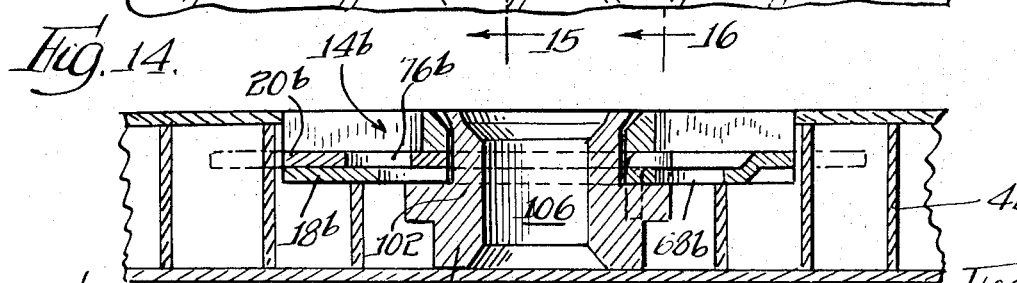
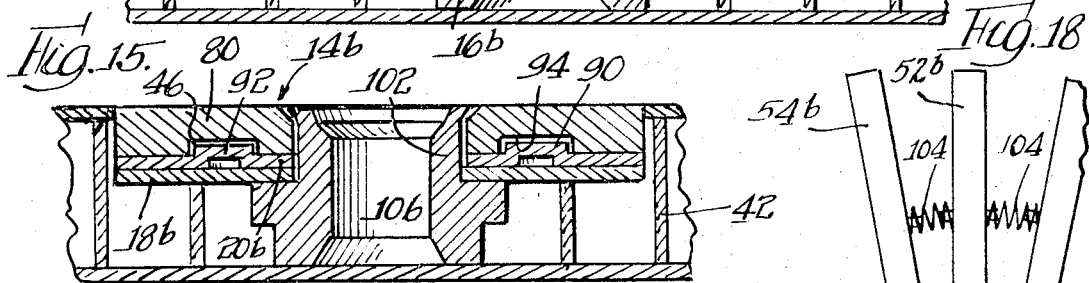
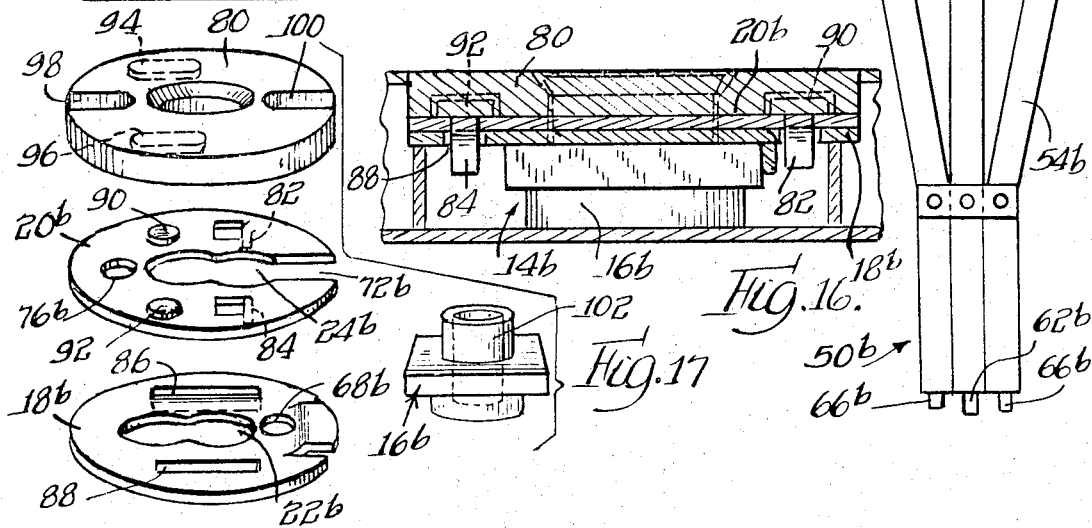

3,766,636

METHOD OF INSTALLING PANEL INSERT DEVICE

This is a division, of application Ser. No. 38,782, filed May 19, 1972 now U.S. Pat. No. 3,662,805.

SUMMARY OF THE INVENTION

Relatively light weight panels of the honeycomb type referred to above have been used extensively as decorative interior walls for airplanes and the like. To secure objects to such panels it is not practical to employ conventional screws such as are commonly used in wood paneling. This is due to the fact that while the honeycomb core exhibits considerable lateral strength, it does not lend itself for direct application thereto of a conventional screw member. To meet this problem, inserts having screw accommodating apertures have been imbedded within the core. The present invention contemplates the provision of a new and improved insert device which may be secured within a panel core with a minimum amount of effort and skill.

More specifically the present invention contemplates a novel insert assembly which may be placed within a preformed cavity in the panel, and by the use of a simple tool, elements of the assembly may be relatively shifted into locking association with the panel core.

A further object of the present invention is to provide an improved insert assembly of the type referred to above, which, after it has been secured within a panel core, will exhibit a neat, trim appearance on the exterior surface of the panel.

BRIEF DESCRIPTION OF THE DRAWINGS

The foregoing and other objects and advantages will be more apparent from the description which follows, when considered in connection with the accompanying drawings, wherein:

FIG. 1 is a plan view of an insert assembly representing one embodiment of the present invention, said assembly shown in association with a fragmentary portion of a honeycomb type panel;

FIG. 2 is a perspective view of the structure shown in FIG. 1;

FIG. 3 is an enlarged plan sectional view taken substantially along the lines 3—3 of FIG. 4, disclosing the superimposed panel locking plates positioned eccentrically with respect to the hub axis;

FIG. 4 is an enlarged central sectional view taken substantially along the line 4—4 of FIG. 3, a screw member being shown in association with the insert assembly;

FIG. 5 is a plan view similar to FIG. 3, disclosing the superimposed plate members in concentric relation with respect to the hub axis;

FIG. 6 is a transverse sectional view taken substantially along the line 6—6 of FIG. 5;

FIG. 7 is a perspective view of the apertured plate members and adapter member shown in separated relation;

FIG. 8 is an elevational view of a tool which may be employed to shift the plate members between a concentric and eccentric relationship with respect to the hub axis;

FIG. 9 is a plan sectional view disclosing an insert assembly of modified form, said section being taken substantially along the line 9—9 of FIG. 10;

FIG. 10 is a transverse sectional view taken substantially along the line 10—10 of FIG. 9;

FIG. 11 is a perspective view of the plate members of FIGS. 9 and 10 illustrated in spaced relation;

FIG. 12 is a side elevation of a tool which may be employed to impart relative movement to the plate members laterally with respect to the hub axis;

FIG. 13 is a view similar to FIG. 3 disclosing an insert device of modified form;

FIG. 14 is a central sectional view being taken substantially along the line 14—14 of FIG. 13;

FIG. 15 is a transverse sectional view taken substantially along the line 15—15 of FIG. 13;

FIG. 16 is a transverse sectional view taken substantially along the line 16—16 of FIG. 13;

FIG. 17 is a perspective view of the plate members and adapter member of the insert device illustrated in FIGS. 13 to 16 inclusive, said parts being shown in separated relation; and FIG. 18 is a side elevation of a tool to impart relative movement to the plate members of FIGS. 13 to 17, inclusive.

DESCRIPTION OF THE PREFERRED EMBODIMENTS

Referring now to the drawings, wherein like numerals have been employed to designate similar parts throughout the various figures, it will be seen in FIGS. 1–7 inclusive that one embodiment of a panel insert assembly of the type contemplated by the present invention is designated generally by the numeral 14. The insert device 14 is in the nature of an assembly comprised of an adapter member 16, and a pair of superimposed plate members 18 and 20. These plate members 18 and 20 are formed with apertures 22 and 24 respectively for accommodating a hub section 26 positioned centrally and extending upwardly from the upper surface of the adapter member 16. The adapter 16, plates 18 and 20, are secured against axial separation by peening the upper extremity of the hub 26 as illustrated in FIG. 6. When the plates 18 and 20 are in adjacent superimposed relation, an extrusion or protuberance 28, struck upwardly from the plane of the plate 18, is adapted to register with a complementary slot 30 provided in the plate 20. Likewise, a protuberance 32 extending downwardly from the plate 20 is adapted to register with a complementary slot 34 in the plate member 18. It will also be noted that the right periphery of the plate member 18, as viewed in FIG. 7, is provided with a plurality of peripheral teeth 36 and the plate 20 is also provided with a series of similar peripheral teeth 38 along the left periphery. In some instances it may be desirable to employ plates without teeth. When the plate members 18 and 20 are concentric with respect to the axis of the hub 26, as shown in FIGS. 5 and 6, the above-described insert assembly 14 may be placed within a previously formed or routed cavity 40 in the honeycomb core 42 of a panel designated generally by the numeral 44. The honeycomb core 42 is bounded by skin sheets 46 and 48. Obviously the cavity 40 will be formed in accordance with the general shape of the insert assembly and extends through the skin sheet 46 and into the honeycomb core 42 toward the opposite skin sheet 48. In the disclosed embodiment the bottom surface of the adapter 16 is positioned adjacent the inner surface of the skin sheet 48 (FIGS. 4 and 6).

After the insert assembly 14 has been positioned within the cavity 40, it is necessary to shift the plates 18 and 20 in opposite directions transversely with respect to the axis of the hub or stub shank 26. This is accomplished by the use of a tool 50, shown in FIG. 8. Tool 50 includes a pair of elongate members or arms 52 and 54. The upper portion of the arm 54 diverges from the arm 52 as shown. The arms 52 and 54 are pivotally mounted at 56 and 58 respectively within a bracket 60 positioned intermediate the extremities of said arms. The lower extremity of the arm 52 is provided with a cylindrical projection 62 conforming generally in diameter with the internal diameter of an internally threaded aperture 64 in the adapter 16. Assume that the plate members 18 and 20 are concentric with the axis of the hub 26 as illustrated in FIGS. 5 and 6. The cylindrical projection 62 of the tool 50 may now be inserted within the adapter aperture 64 and a projection or lug 66 at the lower extremity of the arm 54 may be telescopically associated with a complementary aperture 68 provided in the lower plate member 18. By forcing the free extremity of the arm 54 toward the arm 52, to the dot-and-dash position illustrated in FIG. 8, the plate 18 will be moved laterally with respect to the hub axis from the concentric position shown in FIG. 5 to the eccentric position shown in FIG. 3. In this latter position the teeth 36 will become imbedded within the honeycomb core 42. To shift the upper plate 20 from the concentric position of FIG. 5 to the eccentric position of FIG. 3, it is only necessary to employ the tool 50. With the cylindrical projection 62 inserted within the adpater aperture 64, the projection 66 is positioned within the left extremity of a slot 70. Separating the upper extremities of the arms 52 and 54 will cause the plate 20 to be shifted so as to imbed the peripheral teeth 38 thereof within the honeycomb core 42. A slot 72 in the plate 20 oppositely disposed from the slot 70 provides for clearance of the lower extremity of the arm 54 as it shifts the plate 18 to the position shown in FIG. 3.

Particular attention is directed to the shape of the apertures 22 and 24 in the plates 18 and 20 respectively. It will be noted that the intermediate width of the openings 22 and 24 is somewhat restricted. This is to assure frictional contact of the edges of the plates in this restricted area with the periphery of the hub, and thereby prevent unauthorized shif-ting of the plates 18 and 20 with respect to the adapter 16.

In FIGS. 9–12 inclusive, a slightly modified form of the invention is disclosed. In these figures, an insert assembly designated generally by the numeral 14a is placed within an aperture 40a provided within a honeycomb core 42a of the panel 44a. The panel 44a, like the previously mentioned panel 44, is provided with bounding skin sheets 46a and 48a. An adapter 16a is formed with a hub 26a and an internally threaded aperture 64a. A pair of adjacently superimposed plate members 18a and 20a are provided with apertures 22a and 24a telescopically associated with the hub 26a. This arrangement of apertures permits relative shifting of the plate members 18a and 20a as previously described in connection with the relatively shiftable plates 18 and 20. In order to effect relative shifting of the plates 18a and 20a by a tool 50a (FIG. 12) a lug 28a is struck upwardly from the plate member 18a to register with a complementary slot 30a in the upper plate member 20a. A lug 32a is struck downwardly from the plate 20a and registers with a slot 34a in the plate 18a. To relatively shift the plates 18a and 20a from their concentric relationship, shown in FIG. 11, to their eccentric relationship, shown in FIGS. 9 and 10, it is only necessary to apply the tool 50a so that projections 62a and 66a will span the distance between aperture 32x formed by the struck out lug 32a and the slot 30a. The projection 62a of the tool has an extension 67 of reduced size which will fit within the aperture 32x. The surface of the projection 62a, extending radially beyond the reduced section 67 thereof, will rest upon the upper surface of the plate member 20a, which surrounds the aperture 32x. The extremity of the tool projection or key section 66a should be brought into engagement with the upper surface of the plate member 20a immediately adjacent and to the right of the lug 28a, which at this time is projecting through the slot 30a and above the plane of the upper surface of the plate 20a. With the tool 50a in the above-described position, clockwise rotation to the tool (as viewed from the top of FIG. 11) will cause the reduced tool extension 67 to engage the edge of the upper plate oppositely disposed from the struck out lug 32a and will simultaneously cause the advancing side of the tool projection 66a to press against the portion of the lug 28a, projecting above the surface of the upper plate 20a. This will ultimately cause the lower plate member 18a to be shifted to the left, and the upper plate member 20a to be shifted to the right as indicated in FIG. 9.

The lug accommodating apertures 30a and 34a are slightly narrower at one end, and as a result their respective lugs 28a and 32a frictionally engage the edges of the plate defining these apertures. In the final position, the lugs 28a and 32a will snap into registration with the rectangularly shaped extremities of each slot. In this manner the plates 18a and 20a are locked in the positions shown in FIGS. 9 and 10, with their peripheral teeth 36a and 38a imbedded within the honeycomb core 42a.

A rubberlike ring 74, commonly known in the trade as an O-ring, and a sheet metal collar 76, cooperate to secure the locking plates 18a and 28a against axial separation from the hub 26a. This enables these plates and the associated adapter 16 to be handled as a unitary assembly. The collar 76 which frictionally engages the outer periphery of the hub 26a also provides a trim and flush appearance with respect to the adjacent exterior surface of the skin sheet 46a.

In FIG. 4 a screw member 78 is shown in operative association with the threaded opening 64 for securing an object upon the panel 44. Likewise the threaded opening 64a in the adapter 16a serves to accommodate a similar fastening screw member.

In FIGS. 13 to 17 inclusive, a modified form of insert assembly device is illustrated and designated generally by the numeral 14b. The assembly 14b includes an adapter member 16b which functions similarly to the previously described adapter members 16 and 16a. Relatively shiftable, adjacently positioned plate members 18b and 20b corresponding with the plate members 18 and 20 are capped by a disc member 80. It will be noted that the upper extremity of the adapter member 16b is flared radially outwardly so as to secure the plates 18b and 20b and the disc member 80 in assembled relation.

The plate members 18b and 20b are provided with openings 22b and 24b respectively, as clearly shown in FIG. 17. Fingers or lugs 82 and 84, struck from the plate member 20b, register with, and are guided by, complementary slots 86 and 88 respectively in the lower plate member 18b. Struck upwardly from the plate 20b are protuberances or nibs 90 and 92 which register with, and are slidable within, elongated recesses 94 and 96 provided on the underside of the disc member 80. Diametrically disposed radial slots 98 and 100 are provided along the outer margin of the disc member 80.

From the foregoing, it will be apparent that the preassembly of the above-mentioned parts comprising the insert device 14b is accomplished by telescopically associating the plate member 18b, the plate member 20b and the disc member 80 with an upwardly projecting stub shaft section or collar 102, of the adapter member 16b. The outer extremity of the adapter section 102 may then be swaged radially outwardly as shown in FIGS. 14 and 15 to secure the associated parts against axial separation. In this assembled relation, the protuberances 90 and 92 register with the complementary recesses 94 and 96, and the struck out fingers or tongues 82 and 84 register with the companion slots 86 and 88 provided in the plate member 18b. It will be noted that when the parts occupy the above-mentioned relation, the disc slot 98 exposes and renders accessible the aperture 76b; and the slot 100, registering with the radial slot 72b in the plate member 20b, exposes aperture 68b in the plate member 18b.

When the disc member 80 and plate members 18b and 20b are initially assembled, they occupy a concentric relation with respect to each other. This enables the entire assembly to be placed within a complementary preformed cavity in the honeycomb core 42 as previously described in connection with the use of the insert assemblies 14 and 14a. In order to shift the plate members 18b and 20b to the eccentric positions illustrated by the dot-and-dash line in FIG. 13, it is only necessary to employ a tool such as the tool 50b shown in FIG. 18. This tool 50b differs from the previously described tool 50 in the provision of a pair of normally diverging arms 54b and a central member or arm 52b. The arms 54b are biased in an outward direction by suitable spring members 104. In applying the tool 50b to the concentrically arranged plate members, the lower extremity 62b of the arm 52b is brought into registration with a central aperture 106 of the adapter 16b. The lower extremities 66b of the arms 54b are positioned so that one of these extremities registers with the aperture 68b of the plate member 18b, and the other registers with the aperture 76b of the plate member 20b. By urging the arms 54b toward each other, the plate members 18b and 20b are shifted to the eccentric positions shown in FIG. 13, thereby causing marginal portions of the plate members to become imbedded within the honeycomb panel 42.

From the foregoing it will be apparent that the present invention contemplates the provision of a very practical and economical insert assembly which may be installed within a honeycomb type panel with a minimum of effort and skill. Relatively shifting the locking plates by the simple expediency of a tool so as to cause the core-engaging teeth thereof to become embedded within the panel core, assures a firm fit of the assembly within the panel.

In instances where necessary, a suitable cover plate may be placed over the insert assembly disclosed in FIGS. 1–6 inclusive, to counteract sidewise shifting of the insert device. In the device shown in FIGS. 7–12, inclusive, the annular collar member provides a suitable cover for the shiftable plates and adapter member. Also, in FIGS. 13–17 inclusive, a member or disc 80 serves as a cover the the shiftable plates and provides openings which render the apertures in the plates accessible for the tool 50b.

I claim:

1. The method of installing insert devices within lightweight panels such as panels composed of a honeycomb core bounded by skin sheets and having an insert accommodating cavity extending through one of said sheets and continuing into said core toward the opposite sheet, including the step of placing an insert assembly having a plurality of adjacently disposed, relatively shiftable plate members within the aforesaid panel cavity, engaging with a tool member the outwardly facing sides of the adjacent plate members and linearly shifting the plate members radially of the axis of the insert so as to cause peripheral sections of each plate member to impinge and interlock with the panel core.

2. The method of installing insert devices as set forth in claim 1 wherein said plate members are shifted in opposite directions.

* * * * *